Jan. 26, 1960 M. A. McDERMOTT 2,922,567
INVENTORY STORAGE CONTAINER
Filed July 23, 1957 2 Sheets-Sheet 2

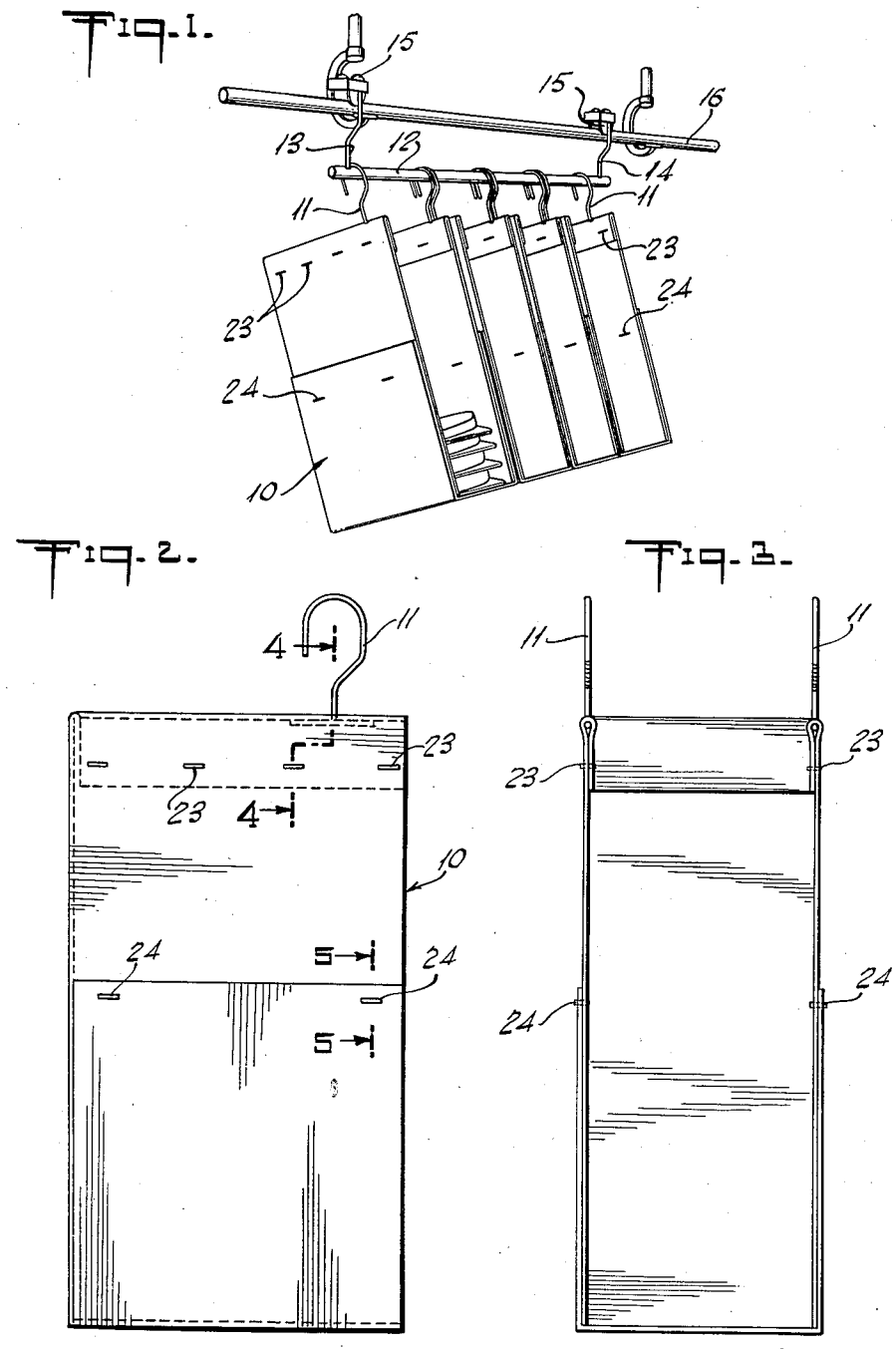

INVENTOR
MARTIN A. McDERMOTT
BY
Burgess, Ryan, & Hicks
ATTORNEYS

United States Patent Office 2,922,567
Patented Jan. 26, 1960

2,922,567

INVENTORY STORAGE CONTAINER

Martin A. McDermott, Brooklyn, N.Y.

Application July 23, 1957, Serial No. 673,699

5 Claims. (Cl. 229—52)

The present invention relates to an inventory storage container and relates, more particularly, to an inventory container suitable for the storage of merchandise in conjunction with a monorail storage system.

An object of the present invention is to provide an inventory storage container in which individual items of relatively small size may be readily stored in conjunction with a mono-rail inventory storage system, to increase the utility and effectiveness of such a storage system. Another object of the invention is to provide an inventory storage container which can be knocked-down and stored flat when not in use and which can be erected readily for use when required. A further object of the invention is to provide an inexpensive container for the storage of a number of relatively small individual items of merchandise in a convenient and readily accessible manner.

Other objects and advantages of the invention will be apparent and best understood from the following description and the accompanying drawings, in which:

Fig. 1 is a perspective view illustrating a number of inventory storage containers embodying the invention supported from a mono-rail system;

Fig. 2 is a side view of one of the inventory storage containers shown in Fig. 1;

Fig. 3 is a front view of the inventory storage container shown in Fig. 2;

Figure 7:
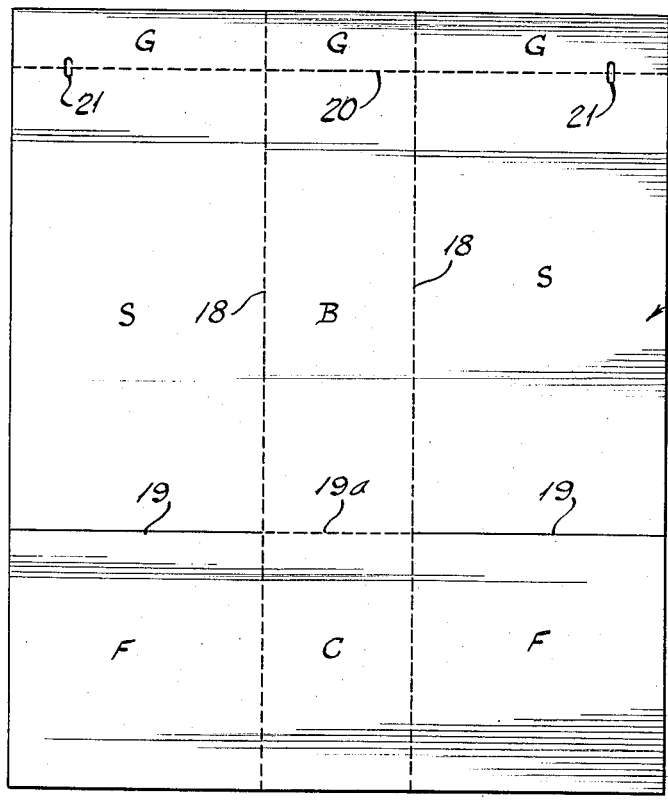
Fig. 7 is a plan view of a blank from which the container shown in Fig. 2 is formed in knockdown form.
Figure 4:
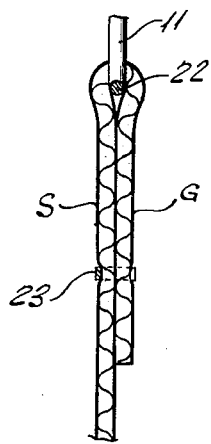
Fig. 4 is a section view taken along the line 4—4 of Fig. 2.

Referring to the drawings in detail, there is a storage container 10 which is open at the front and top thereof.

A supporting hook 11 is secured at the top edge of each side of the container and extends beyond the top. The supporting hooks are located somewhat off-center between the center and the forward edges of the sides of the container and they extend beyond the top edges of the sides to engage with a horizontal rod 12 which is part of a movable trolley of a mono-rail system. With the hooks being located off-center, the containers are tilted rearwardly, as shown in Fig. 1, to prevent merchandise falling out of the open front when the containers are supported on the rod by the hooks.

The mono-rail storage system is of conventional construction and forms no part of the present invention. Such a system permits merchandise to be readily moved between storage locations and receiving and shipping locations. Briefly, the horizontal rod 12 is supported by arms 13 and 14 which extend upwardly from each end thereof. Each of the arms 13 and 14 is connected to a wheel 15 which runs on top of a rail 16 and permits the trolley and merchandise carried thereon to be easily moved to a desired location.

In use, an empty storage container 10 is hung on the rod by its supporting hooks at a loading point and the stock of the particular item of merchandise is then placed in it. The merchandise is placed in the container through the open front thereof and is readily visible for the selection of desired items or for stock taking purposes. As shown in Fig. 1, several containers are supported from each rod and the stock may be distributed according to size or color among the several containers.

When the containers carried by a rod have been filled, the trolley is then shifted on the mono-rail system to the desired storage location. In such movement, the rearward tilt of the containers insures that the contents will not spill from the containers. That is particularly important in movement of the trolleys with the containers as a rocking motion may be imparted to the containers by changes in the direction of the mono-rail.

As shown best in Fig. 7, the storage container 10 is formed from a rectangular sheet 17 of corrugated paper board or the like. The sheet 17 is scored along lines 18 which extend from the top edge to the bottom edge thereof and permit the bond-like material to be folded readily. The lines 18 are spaced apart to correspond to the desired width of the container. At a point spaced from the bottom edge of the sheet corresponding to the depth of the container, the sheet is cut along the lines 19 extending from the side edges of the sheet to the vertical score lines 18 and a score line 19a extends between the vertical score lines 18 from the inner ends of the two cuts.

The sheet is also scored horizontally along a line 20 spaced a short distance below the top edge thereof and extending across the sheet. Folding of the sheet along the line 20 forms a reinforcing and hook retaining rim extending around the top of the container. However, it will be noted that a fold along the line 20 will not interfere with storing the sheet in flat condition. If desired, the sheet may be slit along the lines 18 between the top of the sheet and the fold line 20 to facilitate folding of the sides when the container is formed.

The sheet is, thus, divided by the score lines and cuts into a back panel B, side panels S, a bottom panel C, side flaps F and a top fold G. To form the container, the sheet is first folded along the line 20 which provides a double thickness at the top edge thereof. The hooks 11 are then placed inside the fold between the two thicknesses of the sheet material with their ends extending through openings 21 in the folded edge of the sheet located at positions between the centers and the front edges of the sides of the container.

Figure 6:
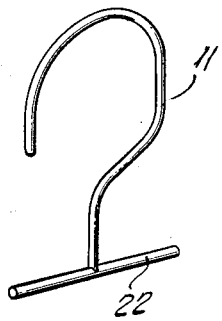
Fig. 6 is a side view of a supporting hook for the storage container shown in Fig. 2.
Figure 5:
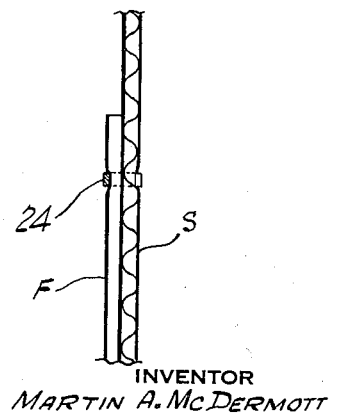
Fig. 5 is a section view taken along the line 5—5 of Fig. 2.

As shown in Fig. 6, the hooks 11 include anchoring members in the form of bars 22 which are connected to and extend at right angles to the shanks of the hooks. The bars 22 engage with the inside of the fold at the top edge of the sheet to support the container and the hooks may be turned down when not in use.

The top fold is secured to the sides and back of the sheet by staples 23 which maintain it in folded condition and keep the hooks in place. It will be noted that when the hooks are secured in place in this manner, the sheet remains in flat condition and a supply of knocked-down containers can be stored in a minimum space. The containers can be quickly and easily erected for use as storage units by merely folding the sides along the score lines 18 and the bottom along the score line 19a. The side flaps are then folded so that they extend upwardly along the sides of the container to which they are secured by removable fastening means, such as staples 24.

The container is then in condition for use. However, the container can be readily knocked down or collapsed to flat condition again by simply removing the staples securing the side flaps to the sides of the container.

Two such containers may be used as shipping containers where shipments of stock are to be made from a central warehouse to retail outlets. For this purpose, the two containers are placed so that they complement each other with the back and bottom of one container closing the front and top of the other container. Adjoining edges of the containers may then be sealed to insure against tampering with the contents.

It will be understood that the sheets from which the containers are formed may be made from other suitable materials such as composition board, sheet metal or the like, which can be folded in the manner described above.

It will be apparent from the foregoing description that storage containers embodying the present invention make it possible and practical to store small individual items of merchandise, such as shirts, blouses, and the like, in conjunction with a mono-rail inventory storage system, thereby greatly increasing the effectiveness and utility of such a system.

It will also be understood that various modifications and changes may be made in the embodiment of the invention illustrated and described herein without departing from the scope of the invention as defined by the following claims:

I claim:

1. A collapsible container for storing merchandise in conjunction with a mono-rail storage system which comprises a sheet of self-supporting material folded to form a rectangular box having two opposing sides, a back and a bottom, said box having openings at the front and top thereof, each of the sides having a portion of double thickness formed by a fold at the top edge thereof, a supporting member extending through an aperture in the fold at the top edge of each of the sides, said supporting members being located opposite each other at points between the center and the forward edge of each of the sides and having anchoring portions located inside of the folds forming the portions of double thickness and extending lengthwise with respect to the top edges of the respective sides, and removable means for holding the sheet in folded condition.

2. A collapsible container for storing merchandise in conjunction with a mono-rail storage system which comprises a sheet of self-supporting material folded to form a rectangular box having two opening sides, a back and a bottom, said box being open at the top and front thereof, said bottom having flaps at its ends extending upwardly along each of the sides, removable means for securing said flaps to the sides of the container and thereby holding the sheet in folded condition, each of said sides having a fold at the top edge thereof forming a portion of double thickness extending lengthwise along said top edge and supporting members extending through apertures in the folds and projecting beyond the top edge of each of the sides, said supporting members being located opposite each other at points between the center and the forward edge of each of the sides and having anchoring portions located inside of the folds.

3. A collapsible container for storing individual items of merchandise in conjunction with a mono-rail storage system which comprises a rectangular receptacle erected from a flat sheet of self-supporting material, said receptacle having side walls, a back wall and a bottom wall and being open at the front and top thereof, a fold extending along the top edge of each of the side walls of the receptacle and forming a portion of double thickness, a supporting member having a hook-shaped end extending through an aperture in the fold at the top of each of the side walls of the receptacle and beyond the top edge thereof, said supporting members being located opposite to each other at points between the center and the front edge of the respective side walls whereby the receptacle is tilted rearwardly when supported by the hook shaped ends of said members, and means for holding the flat sheet of material in erected condition.

4. A collapsible container for storing individual items of merchandise in conjunction with a mono-rail storage system as defined in claim 3 wherein the receptacle is formed from a sheet of corrugated paper board.

5. A collapsible container for storing individual items of merchandise in conjunction with a mono-rail storage system as defined in claim 3 wherein the receptacle is formed from a sheet of corrugated paper board and the means for holding the flat sheet of material in erected condition includes flaps connected to the bottom of the receptacle and extending upwardly along each of the sides thereof and removable staples extending through the flaps and engaging with the side adjacent thereto.

References Cited in the file of this patent

UNITED STATES PATENTS

| | | |
|---|---|---|
| 1,152,240 | Todd | Aug. 31, 1915 |
| 1,751,473 | Deubener | Mar. 25, 1930 |
| 2,186,209 | Roth | Jan. 9, 1940 |
| 2,579,518 | Schaefer | Dec. 25, 1951 |
| 2,639,819 | Marks | May 26, 1953 |
| 2,790,556 | Burt | Apr. 30, 1957 |